No. 855,175. PATENTED MAY 28, 1907.
O. L. HERSHISER.
BEEHIVE.
APPLICATION FILED SEPT. 28, 1904.

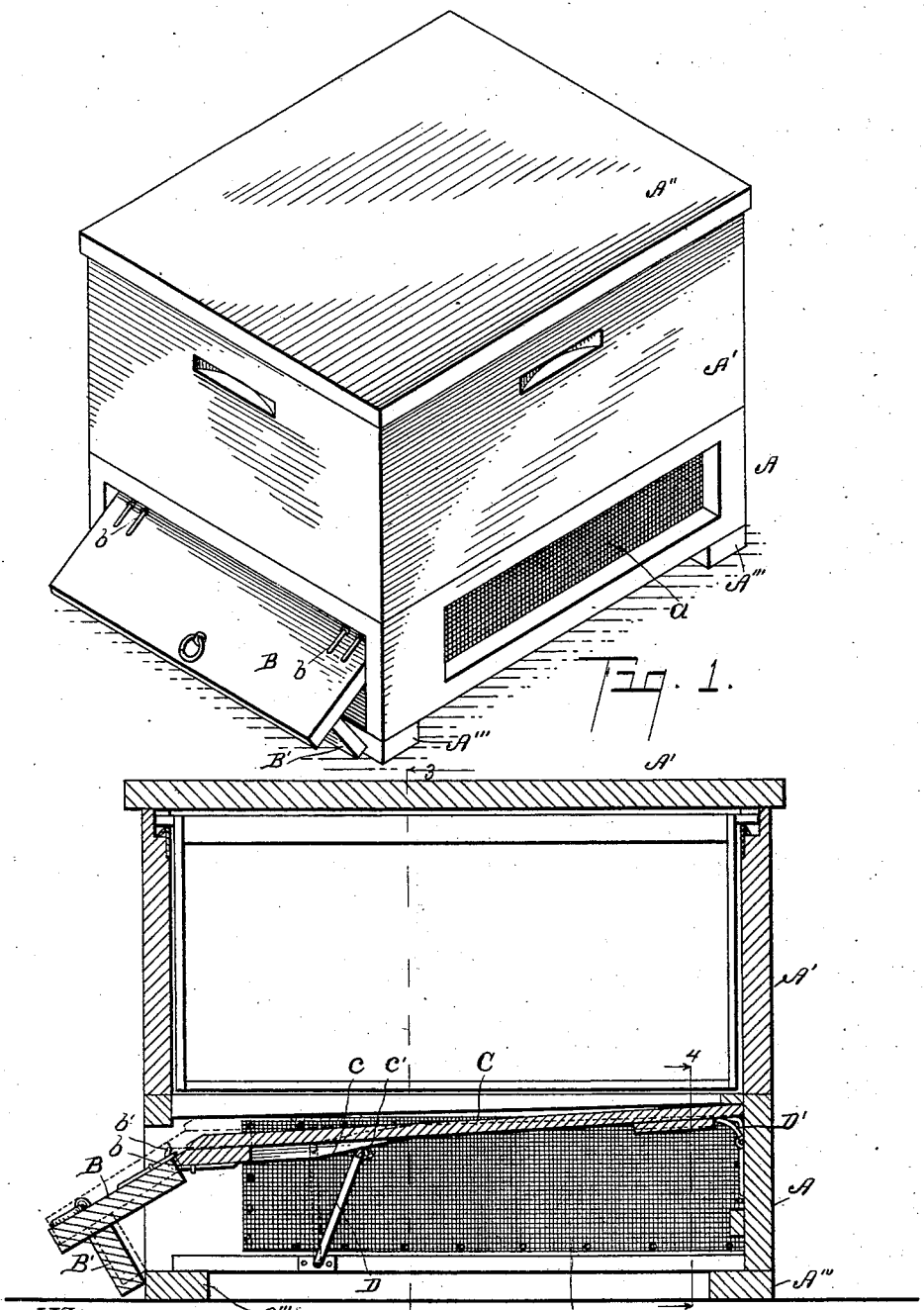

2 SHEETS—SHEET 2.

Witnesses:
Elizabeth Owens
Ethel A. Teller

Inventor,
Orel L. Hershiser
By Chappell & Earl
Att'y.

UNITED STATES PATENT OFFICE.

OREL L. HERSHISER, OF BUFFALO, NEW YORK.

BEEHIVE.

No. 855,175. Specification of Letters Patent. Patented May 28, 1907.

Application filed September 28, 1904. Serial No. 226,385.

*To all whom it may concern:*

Be it known that I, OREL L. HERSHISER, a citizen of the United States, residing at the city of Buffalo, county of Erie, State of New York, have invented certain new and useful Improvements in Beehives, of which the following is a specification.

This invention relates to improvements in bee hives, and particularly to improvements in the bottom board and stand for such bee hives.

The objects of this invention are, first, to provide a better and safer bee hive for use in wintering bees in cellars or other special repositories. Second, to provide a bee hive in which it is possible to accomplish the safe and easy moving and shipping of bees and thus make migratory bee keeping an easy success. Third, to provide a structure with an improved means of regulating the size of the entrance to suit a varying temperature and varying size of colony, and to provide an entrance into which rain and sleet cannot beat and into which the drifting of snow is reduced to the minimum; and an entrance which will not clog with dead bees, and one from which the bees of the colony may remove the dead bees without exposure to the outside weather when wintering bees out of doors. Fourth, to provide a hive in which it is possible to bring the bees under the absolute control of the apiarist, should they attempt to engage in robbing. Fifth, to provide a ready and expeditious means of preventing the melting down of the combs of a hive and the consequent ruin of the colony during periods of intense heat or in hot climates.

Further objects, and objects relating to details of construction will appear in the detailed description to follow.

I accomplish the objects of my invention by the devices and means described in the following specification.

The invention is clearly defined and pointed out in the claims.

Figure 3:
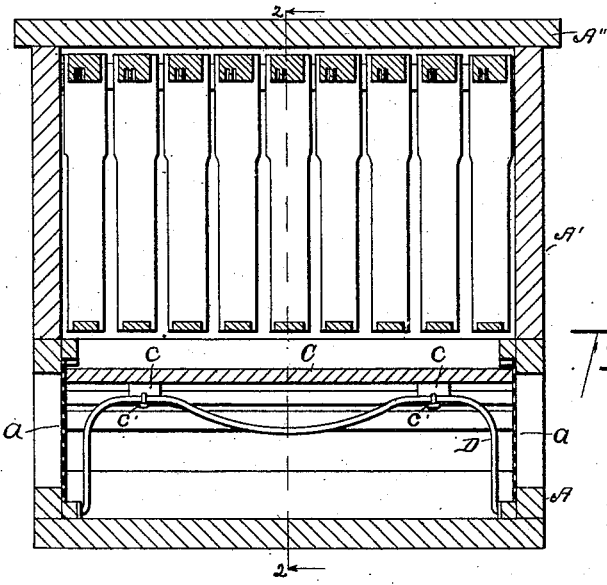
Figure 4:
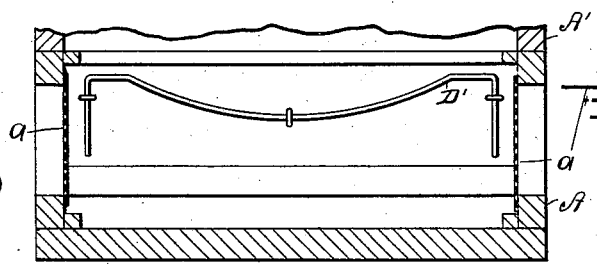
Figure 6:
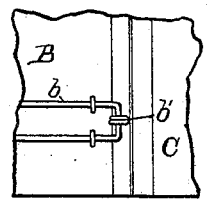
Figure 5:
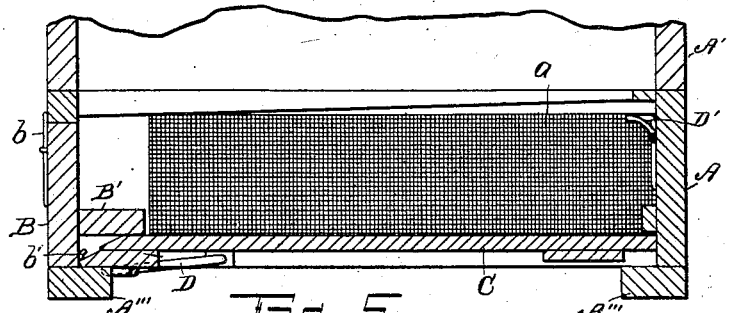

A structure embodying the features of my invention is fully illustrated in the accompanying drawing forming a part of this specification, in which, Figure 1 is a perspective view of a hive embodying the features of my invention, with the alighting board in position, and the entrance open. Fig. 2 is a longitudinal sectional elevation through a bee hive on a line corresponding to line 2—2 of Fig. 3, showing the relation of the various parts, with the bottom and alighting boards lowered a little below normal position for ordinary outdoor use, the normal position being shown by dotted lines. Fig. 3 is a transverse sectional elevation on line 3—3 of Fig. 2, showing details of construction of the bottom board and its adjustable bail support. Fig. 4 is a transverse sectional elevation on line 4—4 of Fig. 2 showing the flexible wire support for the rear end of the bottom board. Fig. 5 is a detail sectional view of the lower portion of a hive, on line 2—2 of Fig. 3, corresponding exactly to the lower portion of Fig. 2, showing the normal position for wintering bees, the bottom board being dropped down to the bottom of the hive stand, and the entrance closed. Fig. 6 is a detail plan view showing the method of coupling the alighting board to the bottom board.

In the drawings, the sectional view are taken looking in the direction of the little arrows at the ends of the section lines and similar letters of reference refer to similar parts throughout the several views.

Referring to the lettered parts of the drawing, A is the base or stand on which the main hive or hive proper A' rests. The hive proper above this stand A is of any desired construction. This stand or bottom A is open at the sides which are covered with wire screen as *a* and is open at the front, the front board B being removable. This base is open at the top and bottom and is provided with cross pieces A''' on its under side. The cleats into which the bail D is hinged serve as a support for the adjustable bottom-board C, so that when the same is placed in its lowest position and the front-board inserted, the hive is adjusted for the wintering of bees in the cellar or for any of the purposes where it is desirable to confine them. Toward the rear end of the hive, a flexible spring support D' is provided for the rear end of the bottom board C when it is in its upper position. When the bottom board C is in its upper position, the hive proper is in condition for ordinary outdoor use. The rear end of the bottom-board is then against the inside rear end of the base or stand and is held snugly against the shoulder formed by the cleats at or toward the inside upper edges of the sides and rear end of said base or stand, by the flexible wire spring D' and the bail-like support D. The front-board B is attached to the bottom-board C, as and for an alighting board, supported in the desired inclined position by means of the cleat B'.

The front end of the bottom board C is supported in an elevated position by the upwardly projecting bail D which is pivoted on the side of the base toward their lower edges. The bail D engages the pin C' on the under side of the bottom board C to hold it in a partially elevated position when an enlarged entrance to the hive is desired. By adjusting this bail, the size of the entrance opening is controlled. The front board B of the base is removable and has a strip B' on the inside thereof a little distance from the bottom, so that when the bottom board C is dropped down into the bottom of the base A and the front board is inserted, this projection B' retains the bottom board securely in position, the rear end of the bottom board projecting under a suitable cleat, as clearly appears in Fig. 5. When the adjustment is, as appears in Fig. 5, the base is closed with the exception of the screen a on each side. This screen allows the free circulation of air up through or into the hive. An important feature in this connection is that the bottom-board C fits into the box-like base so loosely that there will never be any trouble by reason of swelling. It may be made as much as one-half inch narrower than the inside width of this box-like stand. It will not, therefore, become immovable or hard to operate, as it will never bind at the sides, due to a swelling of the material. Again, the cleats at the upper inside margin of the top side pieces and rear end form a shoulder against which the bottom-board is pressed, thus making it be tight and obtaining a closer fit than could be secured in any other way. Moreover, the bees cannot get at the edges of the bottom board to propolize or glue them. The result is that it is impossible for the bottom-board to become fixed and immovable by reason of swelling of the material or from the presence of propolis; but, on the contrary, it always works freely and easily. All previous attempts of which I am aware, to make a bottom-board detachable or tilting or removable from the frame in which it works have failed because of the propolis or bee-glue or because of the swelling of the parts.

The front board B is provided with a pair of loops b (see Fig. 6) which are adapted to engage hooks b' on the front of the bottom board C so that when the hive is in ordinary outdoor use, this board B is withdrawn from the front of the base and hooked on the front of the bottom board and serves as an alighting board for the bees.

I have described and illustrated this structure in detail in the form which seems to be the most practical but I desire to state that the structure is capable of great variation in its details without departing from the spirit of my invention. I, however, desire to claim the device specifically as well as broadly and have therefore described them in detail. That the uses of my invention may clearly appear, I will at length, state the methods adopted.

When bees are placed in the cellar or special repositories in lieu thereof, it is the usual custom to raise the hive at the front an inch or more from the bottom board securing it in this position by means of blocks arranged between the bottom of the hive and the top of the bottom board at each of the front corners. Sometimes the bottom board is removed entirely and the hives are placed in rows in the cellar with a space slightly less than the width of the hive between each two hives in the row. The second tier of hives is placed above this tier or course with the bottom over the open space, the hives breaking joints with the hives below, and so on up as high as it is desired or convenient to go. This arrangement is for the purpose of providing needed ventilation. However, bees placed in the cellar in this manner very often leave the cluster and their hives in considerable numbers as they frequently become uneasy as the result of long confinement or insufficient ventilation. Bees that leave their cluster or hives in the cellar are sure to die on the cellar floor, as it is impossible for them to return to their hives in the darkness and confusion. The cellar or repository thus becomes strewn with dead bees and the colonies are weakened in proportion to such losses, often resulting in their death or the rendering of them so weak as to make them useless. By means of my invention, each colony has ample ventilation when the hive is arranged as indicated in Fig. 5, because air enters through the screens a at the sides. The bees are unable, with my invention, to go so far away from the cluster that they cannot return and the colony, as a consequence, not meeting with the loss due to the bees leaving the cluster and becoming destroyed, are in a very strong and healthy condition in the spring and are very much superior after being wintered properly than by the old method referred to.

In the moving of the bees my invention permits of expeditious closing and opening of the hives to confine the bees or admit them to flight as the case may be, when the hive is arranged as in Fig. 5, it only being necessary to draw out the front board by taking hold of the ring or handle, drawing the bottom forward, raising it up and sliding it back into position above the yielding spring D' and swinging the bail D up under it, holding it firmly against the shoulder formed by the cleats at or near the upper inside edges of the rear and sides of the stand, and then hooking the front board B on the hooks B' by the loop b. This makes it possible to expeditiously move the bees to the cellar in the fall, or from the cellar in the spring and moving the bees to out apiaries and returning them therefrom, or shipping bees long distances by freight, express or otherwise. This handling, moving and shipping of bees is done with absolute safety from stings to the operatives employees of transportation companies, and horses, and also in perfect safety to the bees from any danger of overheating or suffocating or the melting down of their combs because the ample room in the box-like stand beneath the hive proper, abundantly ventilated, enables them to keep in perfect condition. It will, therefore, be seen that my invention renders migratory bee-keeping entirely practicable by giving safety to the bees and safety to operatives and horses which may be employed for drawing the bees about. Further, when bees are removed from the cellar in the spring, they frequently become aroused, and if allowed their freedom, will fly about sometimes furiously stinging the operatives, and in trying to return to their hives, they frequently become confused and mixed with the bees of other hives, thus causing some hives to become very strong and others so weak as to be worthless. This state of affairs frequently results in the robbing and fighting among the bees to the great loss of the apiarist. It is obvious that my invention enables the apiarist to perfectly control bees so that they may be placed on their stands in safety and allowed to remain until settled in the evening, when all of the hives may be quietly adjusted and all allowed to commence flying the next day together when there will be no confusion.

In the spring, when the colonies of bees are at their lowest numerical strength, it is often desirable to contract the entrance to the hive in order to conserve the heat, and at other seasons of the year, contraction of the entrance is desirable if the colony is small or if the bees are disposed to rob. My invention allows of the greatest possible latitude in the regulation of the size of the entrance. When the bottom board is placed in its normal position for summer use, fitting closely to the rear end of the stand and against the shoulder at the rear end and sides, the entrance is sufficiently large for all colonies under ordinary conditions. Whenever it is desirable to contract the entrance to the hive, it may be done by simply drawing the bottom board forward until the desired size of entrance is obtained. A notch may be cut in one corner of the bottom-board and the latter may then be drawn forward until the entrance is entirely closed, except the notch, thus adjusting it to the flight of such small number of bees as is desired. The adjustment of the bail to the rear enlarges the entrance opening. By use of this adjustment, the entrance may be enlarged as desired to the extent of the whole of the front opening to the stand. A very large entrance is often desirable during a heavy honey flow to give the bees greater freedom in leaving and returning to their hives and retard the tendency to swarm. It is also desirable in case of hiving a large swarm.

Bees, especially in warm climates, sometimes engage in robbing in such a wholesale way as to result in great loss of bees and honey. My device enable a perfect and effective control of the entrance to the hive so that the hive can be entirely closed, as for cellar wintering, and the bees left confined until night fall or until the danger of robbing is past. Also, in hot climates where bees are extensively kept, the temperature often rises to such a degree as to melt down the combs in the hives causing a great loss to the apiarist in that way. Bees are likely at such times to engage in wholesale robbery. Apiaries have been practically ruined in this way. Abundance of free ventilation such as can be readily afforded by lowering the bottom board to the position when preparing the hives for moving or cellar wintering, leaving the front entirely open, allowing the air to circulate freely through the sides and front and under the cluster, will provide the greatest relief possible in such an emergency.

I have described the use of my device very fully and the reason for all of its details thus clearly appears.

Having thus described my invention, what I claim as new and desire to secure by Letters Patent, is:

1. In a bee hive, the combination of the hive body A'; of a base or stand A open at its top and bottom and at each side, and at the front, with screens a' for the side openings; a bottom board C adjustable up and down and forward and back within the stand A; cleats across the front and rear under sides of the bottom-board, the front cleat being beveled upward and backward to conform to a like bevel on the upper front end of the bottom-board to provide a suitable entrance to the hive body; an elastic wire support D' for the rear end of the bottom board when in its upper position; an adjustable bail-like support D pivoted toward the lower edges of the side walls of the stand A, and positioned to swing up against the under side of the bottom board for adjusting the same; a removable front board B for the stand, with cleat B' secured to its inner side, arranged to project inwardly and lock the bottom board in its lower position; loops b on the front board B, and hooks b' on the front of the bottom board C for engaging the same, all coacting substantially as described and for the purpose specified.

2. In a bee hive, the combination of the hive body A'; the base or stand A, open at top and bottom and each side, and provided with a removable front board, adapted to be used as an alighting board; screens for the side openings of said stand; an adjustable bottom board with suitable supports for holding it in an elevated position in the upper part of the base or stand, and cleats for supporting it in its lower position, and connections on the front board for detachably securing it to the bottom board, for permitting it to be inserted into the front of the stand, coacting for the purpose specified.

3. In a bee hive, the combination with the hive body of a base or stand beneath the same; an adjustable bottom board adjustable up and down within the base or stand for opening the hive body varying degrees; openings through the side of the stand or base with suitable screen over the same, to facilitate ventilation within the hive; a removable front board in the base, adapted to be connected to the bottom board to serve as an alighting board when required, coacting for the purpose specified.

4. In a bee hive, the combination of the hive body; a box-like base or stand beneath the same; a front-board for closing the front; a bottom-board for closing the bottom; and lateral openings covered with screen to confine the bees within a suitable inclosure, for the purpose specified.

5. In a bee hive, the combination of the hive body; a box-like base or stand with open sides covered with screen and a bottom-board for the body of the hive adjustable up and down and forward and back within the box-like base, for the purpose specified.

6. In a bee hive, the combination of a hive body; a box-like stand beneath the same open at its front with suitable inside cleats at the top; a yielding support D' provided at the rear of the inside of the box; a bail-like support D toward the front; a bottom board adapted to rest on said supports; and an alighting board having a separable hinge connection to the front end of the bottom board, whereby the bottom board is adjustable to vary the size of the entrance by moving the same forward and back, coacting for the purpose specified.

7. In a bee hive, the combination of a hive body; a box-like base beneath the same with screen side openings; a removable front board with separable hinges on the front board for engaging it to the bottom board whereby the front board can be used as an alighting board, coacting as specified.

8. In a bee hive, the combination of a hive body; a box-like base beneath the same; a removable front board with separable hinges on the front board for engaging it to the bottom board whereby the front board can be used as an alighting board, co-acting as specified.

9. In a bee hive, the combination of a hive body; a box like stand with a removable front board with a cleat on its inner side; a detachable bottom board arranged to be locked in its bottom position by the cleat on said front board, for the purpose specified.

10. In a bee hive, the combination of a hive body; a box-like base or stand; a removable bottom board and a yielding wire support D' for the rear end of the bottom board and a bail like support for the front end of the bottom board.

11. In a bee hive, the combination of a hive body; a box like stand or base, a removable bottom and a support for the rear end of the bottom board and a bail like support for the front end of the bottom board.

12. In a bee hive, the combination of a hive body; a box-like base, the bottom board adjustable therein; cleats at the bottom for retaining the bottom board and a cleat a little above the bottom board for bracing the same when adjusted to its lower position.

13. In a bee hive, the combination of a hive body; a suitable base or stand; an adjustable bottom board and an adjustable alighting board with a separable hinge for attachment to the front of the bottom board.

14. In a bee hive, the combination of a hive body; a suitable base or stand; a bottom board adjustable back and forth beneath the same; and an alighting board detachably hinged to the front of the bottom board, whereby the entrance to the hive can be adjusted by merely drawing the alighting board forward, for the purpose specified.

15. In a bee hive, the combination of a hive body; a box-like base with a bottom-board for the hive adjustable in said base; cleats at the lower inside margin of the sides for retaining the bottom-board, a cleat on the inside of the front-board, and a cleat at the inside rear of said box-like base, properly placed for bracing the same when adjusted to its lower position, for the purpose specified.

16. In a bee hive, the combination of a box-like base with an opening through the front, and a bar across the top; cleats around the inside upper portion of said box-like base; a bottom-board adjustable within the box-like base, fitting against the said cleats and adjustable back and forth to regulate the entrance opening between the front and the top front bar; and an alighting-board connected to the front of said top-board, for the purpose specified.

17. In a bee hive, the combination of a box-like base with an opening through the front and a bar across the top; cleats around the inside upper portion of said box-like base; a bottom board adjustable within the box-like base, fitting against the said cleats and adjustable back and forth to regulate the entrance opening between the front and the top front bar, for the purpose specified.

18. The combination of a bee hive; a box-like base; an adjustable bottom-board within the same, somewhat shorter than the inside dimension from front to rear of the said box; a cleat underneath the front of said bottom-board, the said bottom-board and cleat beneath the same being beveled to provide a suitable entrance to the hive body when adjusted for ordinary outdoor use, for the purpose specified.

19. The combination of a bee hive; a box-like base; an adjustable bottom-board within the same, somewhat shorter than the inside dimension from front to rear of the said box, for the purpose specified.

20. The combination of a bee-hive with a box-like base; cleats at the top and inside of the same; a bottom-board loosely fitting into the box with means of clamping it adjustably against the underside of the said cleats, for the purpose specified.

21. The combination of a bee hive with a box-like base; cleats at the top and inside of the same; a bottom-board loosely fitting into the said box, with means of clamping it against the underside of the said cleats, for the purpose specified.

In witness whereof, I have hereunto set my hand and seal in the presence of two witnesses.

OREL L. HERSHISER. [L. S.]

Witnesses:
C. J. FORLONG,
R. D. BURNS.